July 15, 1924.
T. E. HOUGHTON
CHOCK BLOCK FOR AUTOMOBILES
Filed March 16, 1922
1,501,883
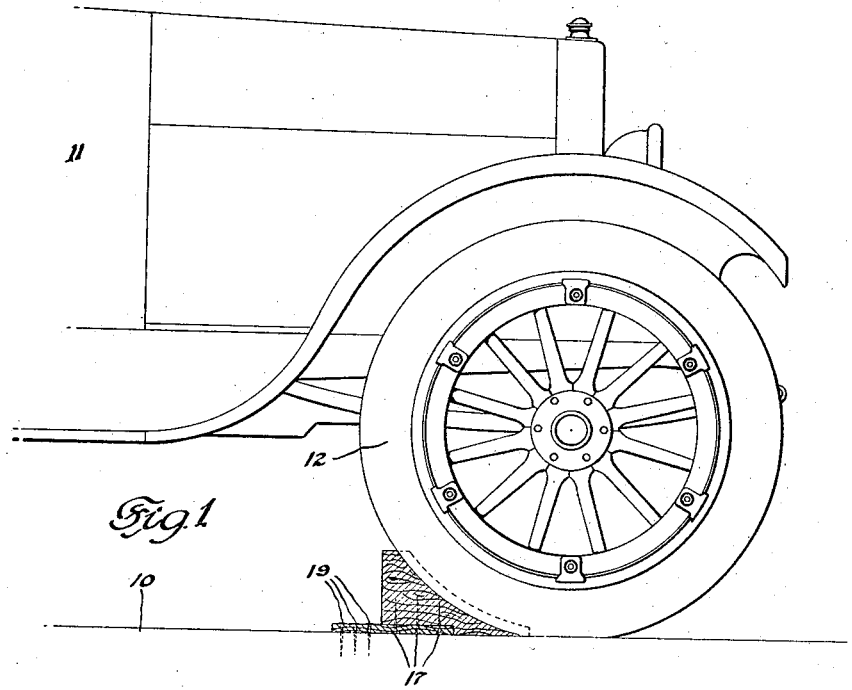
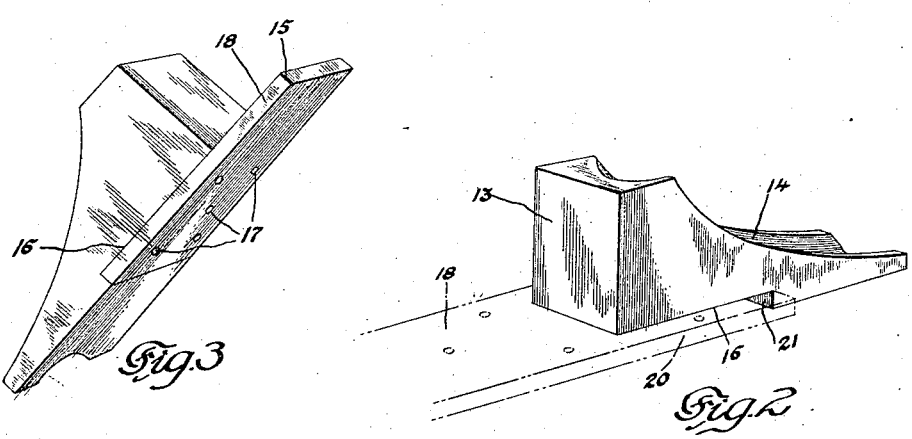
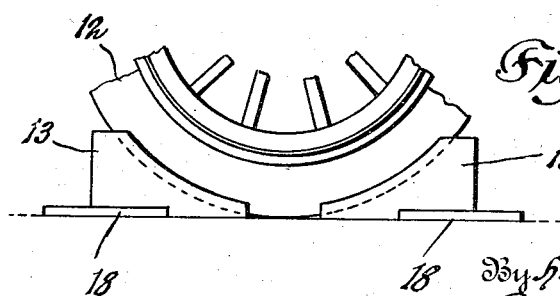
Inventor
Thomas E. Houghton
By his Attorneys Patented July 15, 1924.

1,501,883

UNITED STATES PATENT OFFICE.

THOMAS E. HOUGHTON, OF FLINT, MICHIGAN, ASSIGNOR TO GENERAL MOTORS CORPORATION, OF DETROIT, MICHIGAN, A CORPORATION OF DELAWARE.

CHOCK BLOCK FOR AUTOMOBILES.

Application filed March 16, 1922. Serial No. 544,277.

*To all whom it may concern:*

Be it known that I, THOMAS E. HOUGHTON, a citizen of the United States of America, and a resident of Flint, county of Genesee, and State of Michigan, have invented certain new and useful Improvements in Chock Blocks for Automobiles, of which the following is a full, clear, concise, and exact description, such as will enable others skilled in the art to which the invention relates to make and use the same, reference being made therein to the accompanying drawings, which form a part of this specification.

This invention relates to chock blocks for securing automobiles to the floor of shipping conveyances during the transportation of said vehicles.

One of the objects of the invention is the provision of a new and improved chock block that may be easily and readily secured in position by unskilled labor.

Another object of the invention is the provision of new and improved means for securing a chock block in position to the floor of a freight car or other shipping conveyance.

Other and further objects of the invention will appear as the description proceeds.

On the drawing Fig. 1 designates a side elevation of the forward portion of an automobile showing my improved block in section in position against the wheel. Figs. 2 and 3 are perspective views of the block. Fig. 4 is a side elevation, corresponding to part of Fig. 1, but showing two blocks.

On the drawing the reference numeral 10 designates the floor of the freight car or other shipping conveyance on which is adapted to be secured the automobile 11 which is provided with the wheel 12 of the usual or well known construction.

In securing automobiles to the floor of the shipping conveyance it is the common practice to provide either one or two chock blocks for engaging the wheel of the motor vehicle to prevent displacement thereof. In Fig. 1 only one block is shown as being employed for the wheel 12 but it is understood that an additional block at the front of the wheel may be employed, as shown in Fig. 4. It is also understood that if only one block is employed for each wheel that that block may be applied to either the front or rear of said wheel, together with a single block properly applied to each one of the other wheels. Each chock block 13 is provided with a wheel engaging face which is channeled and curved to fit the contour of the tire as shown at 14.

Additional securing members are provided for securing the blocks to the floor of the shipping conveyance. Any suitable means may be provided for this purpose. As shown on the drawing, strips, boards or attaching members 15 are employed. These members are adapted to be rigidly secured in any suitable manner to the blocks 13. The member 15 is preferably secured to the block 13 by providing a recess in one face of the block as the base or the bottom face at the rear thereof, as shown at 16 in which the member 15 is secured. The depth of this recess is adapted to be the same as the thickness of the attaching member 15 so that when the attaching member is in position in the recesses it will be flush with the bottom face of the block. The attaching member is secured in the recess by any suitable fastening means such as the nails 17.

The attaching member extends beyond the rear face of the block 13 to form an attaching portion 18 which is adapted to be secured to the floor of the car by any suitable fastening means such as the nails 19. The attaching portion 18 may extend to any suitable length as indicated in dotted lines in Fig. 2. If desired, the width of the attaching member 15 may be wider than the block 13 so as to extend to either or both sides of said block to furnish additional attaching means as indicated in dotted lines at 20 in Fig. 2, through which attaching nails may be driven into the floor of the shipping conveyance. Preferably the recess 16 is rectangular in form so that the front wall 21 thereof may form an abutment for the front end of the attaching member 15.

In securing a motor vehicle to the floor of a freight car, the attaching members 15 are first secured in position on the blocks 13 after which the blocks 13 may be placed in position against the wheels and secured in such position by the nails 19.

It will be understood that various changes in the form, construction, composition and arrangement of the several parts may be resorted to without departing from the spirit and scope of my invention; hence I do not wish to limit myself strictly to the structure herein set forth, but

What I claim is:—

1. A chock block for automobiles formed of a solid piece of wood having a channeled concave wheel engaging face and a rectangular recess formed in its base, and an attaching member secured in said recess and extending beyond the outlines of the base of said block at its rear end to provide attaching means for securing the block in position on its support.

2. A chock block provided with a wheel engaging face and a recess in another face thereof, an attaching member secured in said recess, said member extending beyond one end of said block to form an attaching means for securing said block to its support.

3. A chock block provided with a wheel engaging face and having a recess formed in its base, an attaching member in said recess extending beyond one end of said base, the front wall of said recess being so constructed and arranged that it forms an abutment for said attaching means, and means for securing said member in said recess.

4. A chock block for automobiles having one of its faces provided with a wheel engaging surface, an attaching member secured to a face of said block and provided with an extension and means for securing said extension to a support for said automobiles.

5. In combination, a vehicle provided with a wheel, a support therefor, a chock block having a channeled concave surface in engagement with said wheel, a recess in the base of said block, an attaching member secured to said block and located in said recess and extending beyond the rear end of the block, and means for securing said member to said support.

In testimony whereof I affix my signature.

THOS. E. HOUGHTON.